United States Patent
Imaichi et al.

(10) Patent No.: US 7,047,255 B2
(45) Date of Patent: May 16, 2006

(54) DOCUMENT INFORMATION DISPLAY SYSTEM AND METHOD, AND DOCUMENT SEARCH METHOD

(75) Inventors: Osamu Imaichi, Wako (JP); Tetsuo Nishikawa, Tokyo (JP); Toru Hisamitsu, Oi (JP); Makoto Iwayama, Tokorozawa (JP); Masakazu Fujio, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 471 days.

(21) Appl. No.: 10/374,091

(22) Filed: Feb. 27, 2003

(65) Prior Publication Data

US 2003/0220916 A1 Nov. 27, 2003

(30) Foreign Application Priority Data

May 27, 2002 (JP) .............................. 2002-152594

(51) Int. Cl.
*G06F 17/30* (2006.01)
(52) U.S. Cl. ..................... 707/104.1; 707/5; 715/500
(58) Field of Classification Search ................ 707/1–5, 707/100, 102, 104.1; 704/9, 10; 715/500, 715/514, 517
See application file for complete search history.

(56) References Cited

U.S. PATENT DOCUMENTS

| | | | | |
|---|---|---|---|---|
| 5,625,767 A | * | 4/1997 | Bartell et al. ............... | 345/440 |
| 5,675,710 A | * | 10/1997 | Lewis ......................... | 706/12 |
| 6,038,561 A | * | 3/2000 | Snyder et al. ................. | 707/6 |
| 6,081,804 A | * | 6/2000 | Smith ............................ | 707/5 |
| 6,298,174 B1 | * | 10/2001 | Lantrip et al. .............. | 382/305 |
| 6,446,065 B1 | * | 9/2002 | Nishioka et al. ............... | 707/5 |
| 6,584,220 B1 | * | 6/2003 | Lantrip et al. .............. | 382/154 |
| 6,654,738 B1 | * | 11/2003 | Nishioka et al. ............... | 707/3 |
| 6,701,318 B1 | * | 3/2004 | Fox et al. ...................... | 707/10 |
| 6,738,518 B1 | * | 5/2004 | Minka et al. ............... | 382/218 |
| 6,738,786 B1 | * | 5/2004 | Sugaya et al. ........... | 707/104.1 |

FOREIGN PATENT DOCUMENTS

| | | |
|---|---|---|
| JP | 08-320881 | 5/1995 |
| JP | 9-62693 | 8/1995 |
| JP | 2000-011078 | 6/1998 |
| JP | 2000-148760 | 11/1998 |
| JP | 2001-092825 | 4/2001 |

* cited by examiner

*Primary Examiner*—Greta Robinson
*Assistant Examiner*—Cheryl Lewis
(74) *Attorney, Agent, or Firm*—Reed Smith LLP; Stanley P. Fisher, Esq.; Juan Carlos A. Marquez, Esq.

(57) ABSTRACT

The present invention visualizes the contents of a plurality of documents without a lack of the listing property. Two document units are extracted from a document database and relevance degrees between individual elements of a group of the document units are calculated. The results are displayed on a two-dimensional coordinate plane depending on the relevance degree.

16 Claims, 15 Drawing Sheets

Fig.2

| Document unit A \ Document unit B | $B_1$ | $B_2$ | $B_3$ | $B_4$ |
|---|---|---|---|---|
| $A_1$ | $x_{11}$ | $x_{12}$ | $x_{13}$ | $x_{14}$ |
| $A_2$ | $x_{21}$ | $x_{22}$ | $x_{23}$ | $x_{24}$ |
| $A_3$ | $x_{31}$ | $x_{32}$ | $x_{33}$ | $x_{34}$ |
| $A_4$ | $x_{41}$ | $x_{42}$ | $x_{43}$ | $x_{44}$ |

DOCUMENT INFORMATION DISPLAY SYSTEM AND METHOD, AND DOCUMENT SEARCH METHOD

BACKGROUND OF THE INVENTION

1. Field of the Invention

The present invention relates to a document information display system that displays a general view of the contents of a plurality of documents, a document information display method, and a document search method.

2. Description of the Background

With the widespread of computers and the Internet, rapid progresses have been made to put document information into electronic form. As available document information increases, it is an increasingly important issue to find out necessary information therefrom. Information search (retrieval) technologies are technologies to accomplish such issue, and recently it has been common to search for necessary information using a search engine that applies information search technologies.

In the case of major search engines available on the Internet, such as Google (http://www.google.com) or goo (http://www.goo.ne.jp), when a user inputs a search request, Web pages relevant to the request are retrieved through the Internet and search results are displayed in a list format according to an order of relevance degrees. Although the user can obtain necessary information for his or her, the search results may contain information irrelevant to the user's search request. However, when the search results are simply displayed in a list format, the user has to sort out and select necessary information by evaluating the contents of individual search results and this is laborious. Therefore, a mechanism for enabling a user to easily evaluate a group of the documents obtained as search results is needed.

One approach toward the above point is a technology to classify and display search results by using a clustering technology. Herein, the expression "clustering" means grouping of a group of documents in accordance with their similarity, and it is divided into two techniques: hierarchical clustering and non-hierarchical clustering. A result of hierarchical clustering has a tree structure and a result of non-hierarchical clustering has a flat structure wherein only grouping is carried out. As a clustering technique, for example, the method disclosed in JP Patent Publication (Unexamined Application) No. 9-62693, entitled "Document classifying method according to probability model." WiseNut search (http://www.wisenut.com) adopted by Lycos search (http://www.lvcos.co.jp) classifies Web sites of search results and packs similar Web sites into a folder for display. On the other hand, Vivisimo (http://www.vivisimo.com) employs a hierarchical clustering technique for classifying and displaying search results in a tree structure. Both techniques do not simply enumerate search results in a list format, and they improve convenience for user's access to information by classifying search results in accordance with their contents.

However, when the classified results are displayed in a folder format, the contents of only one folder can be referred to at a time, thus resulting in the lack of the listing property on the whole document group. Further, even when a tree structure is employed for displaying the results, nodes of individual trees are required to be deployed and referred to in order, thus resulting in the lack of the listing property, just like displaying a folder format.

SUMMARY OF THE INVENTION

In view of the above present situation, the present invention has an object to provide a document information display system and method, and a document search method, which enable the visualization of the characteristics of the entire document group without a lack of the listing property.

The present invention enables the instant obtainment of a general view on the characteristics of the entire document group by displaying the characteristics of the document group in a two-dimensional coordinate system.

Namely, a document information display system of the present invention that displays information relevant to a plurality of documents on a screen is featured in that a two-dimensional coordinate plane having a document or a sentence, and a document group, a document, a sentence or a word plotted as an element on one axis and as an element on the other axis, respectively, is displayed and the relevance degree between an element of the one axis and a corresponding element of the other axis is displayed at each point of the two-dimensional coordinate plane. This document information display system can be used for overview of the characteristics of the plurality of documents that are obtained by a database search.

The relevance degree of the elements of the two axes may be represented by indicating a color having a brightness or saturation, or a symbol having a size in accordance with the relevance degree at a two-dimensional coordinate point. When the arrangement order of the elements of one axis and/or the other axis is made reflecting the similarity of elements, similar elements are displayed adjacent to each other and thus the relationship between elements can clearly be grasped.

A document information display method for displaying information relevant to a plurality of documents on a screen according to the present invention comprises:

a step for calculating the relevance degree between an individual element of a first group composed of a document group or a sentence group in a document and an individual element of a second group composed of a group of document groups, a document group, a sentence group, or a word group; and a step for plotting the elements of the first group and the second group on one and the other axes, respectively, of a two-dimensional coordinate plane, and displaying the relevance degree between an element of one axis and a corresponding element of the other axis at each point of the two-dimensional coordinate plane.

Typically, the first group is a document group and the second group is a word group, and the method comprises a step for extracting the word group from the document group. Further, the method may comprise a step for calculating the similarity among the elements of one axis and/or the elements of the other axis, and a step for rearranging the elements of one axis and/or the elements of the other axis in accordance with the similarity.

A document search method according to the present invention comprises:

a step for receiving a search request on a document database;

a step for obtaining information on a plurality of documents by searching the document database in accordance with the search request;

a step for extracting a plurality of words from a plurality of documents obtained by the search;

a step for calculating the relevance degree between individual documents and individual words; and a step for transmitting information relevant to the plurality of documents, the plurality of words, and the relevance degree between individual documents and individual words.

This document search method further comprises:

a step for calculating the similarity between plural documents and/or the similarity between the plural words; and a step for sending the calculated similarity between the plural documents and/or between the plural words.

According to the present invention, it is possible to obtain the overview of the document contents without a lack of the listing property by looking at the relevance between document units displayed on the two-dimensional coordinate.

This specification includes unit or all of the contents as disclosed in the specification and/or drawings of Japanese Patent Application No. 2002-152594, which is a priority document of the present application.

BRIEF DESCRIPTION OF THE DRAWINGS

FIG. 2 is a view illustrating an example of a data structure expressing the relevance degree between document units.

DETAILED DESCRIPTION OF THE INVENTION

Figure 1:
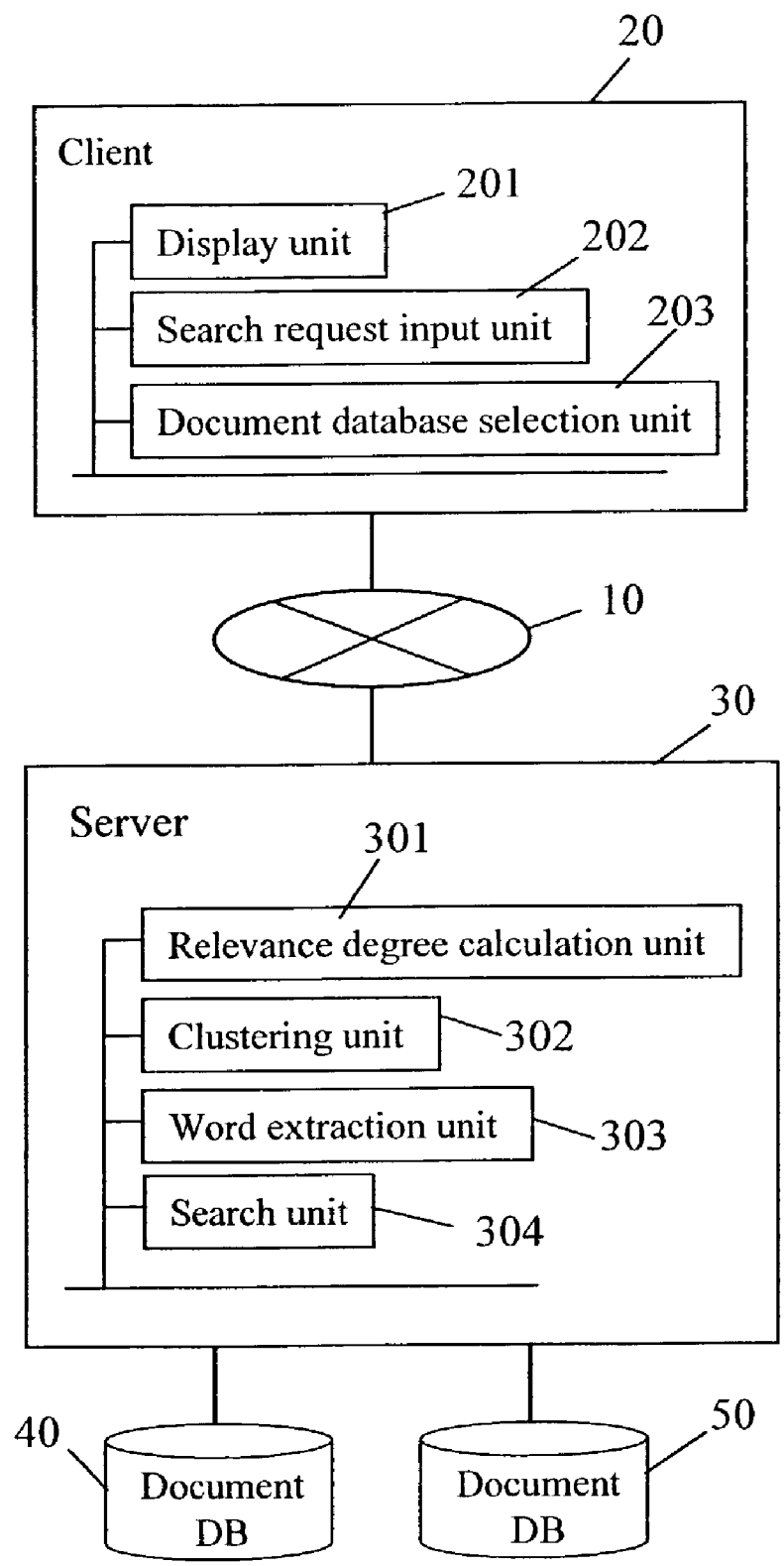
FIG. 1 is a schematic view illustrating an example of a system configuration to implement the present invention.

Representative embodiments of the present invention are described below.

(1) In the case where there is provided one group of documents, the group of documents and a group of words contained in the group of documents are disposed (plotted) on one axis and the other axis, respectively, and then the relevance degree between a word i and a document j is indicated at a coordinate (i, j) with an indication type according to the relevance degree. By displaying the relationship between the documents and words in the two-dimensional coordinate system, it is possible to grasp at a glance the characteristics of the document groups, such as "which document a certain word is contained in" or "which word a certain document contains."

(2) When there are provided two document groups (document groups A and B), document groups A and B are plotted on one axis and the other axis, respectively, and the relevance degree between a document i of document group A and a document j of the document group B is indicated at a coordinate (i, j) with an indication type according to the relevance degree. By displaying the relationship between the documents in the two-dimensional coordinate system, it is possible to grasp at a glance the characteristics of the document groups such as the relationship between document groups as a whole or between individual documents.

When the document groups A and B are identical and the above display process is used, the relationship between individual documents in a single document group can easily be grasped. However, in that case, when identical documents are plotted on both vertical and horizontal axes, the relevance degree therebetween should not be displayed because it does not contain significant information.

(3) In the above embodiments (1) and (2), when the elements of either or both of the vertical and horizontal axes are subjected to clustering for rearrangement and the results are displayed in the two-dimensional coordinate system, documents or words having high relevance degree, in terms of the axis direction subjected to the clustering, are adjacently plotted in clusters. As a result, the relevance degree between the elements of the vertical axis and those of the horizontal axis is more clearly visualized in the two-dimensional coordinate system in comparison with a case wherein the clustering is not carried out, thereby making it possible to easily grasp the characteristics of the document groups.

(4) In the above embodiments (1), (2), and (3), when the number of elements on the vertical and horizontal axes are large, individual element names (words, article title, etc.) are not displayed on the coordinate axes. Then, an arbitrary region on the two-dimensional coordinate plane is selected and the selected region is magnified and displayed. It is possible to grasp the condition as a whole through a screen displaying the entire coordinate plane and to learn individual element names of the vertical and horizontal axes by displaying a magnified region of interest.

(5) When there are provided two sentence groups (sentence groups A and B), sentence groups A and B are plotted on one axis and the other axis, respectively, and the relevance degree between an element i of the sentence group A and an element j of the sentence group B is indicated at a coordinate (i, j) with an indication type according to the relevance degree. When the sentence groups A and B are included in one single document (e.g., an outline and main body of a thesis, or claims and description of examples in a patent publication), it is possible to grasp the internal structure of the document by displaying the correspondence relationship between sentence groups in the document on the two-dimensional coordinate plane. When sentence groups A and B are derived from two different documents, it is possible to analyze the internal structure of the documents, such as which portions of the two documents are relevant, and at the same time to compare sentence groups A and B with each other by displaying the correspondence relationship between sentence groups from two different documents on the two-dimensional coordinated plane.

(6) The two-dimensional coordinate plane of the above (5) is displayed on an upper unit of a screen and the sentence groups A and B are displayed on a lower unit of the screen. When an arbitrary region on the two-dimensional coordinate plane is selected, a range of sentence groups A and B corresponding to that region is identified and displayed. Further, when a sentence of either one of the displayed sentence groups is selected, a region of the two-dimensional coordinate plane corresponding to the sentence is identified and displayed and additionally, a sentence of the other sentence group corresponding to the selected sentence is identified and displayed. This enables a user to visually grasp the relationship between individual sentence groups and easily make overview, comparison, and analysis on the document contents.

Hereinafter, examples of the present invention will be described with reference to the attached drawings.

FIG. 1 is a schematic view showing an example of a system configuration to implement the present invention. This system comprises a client 20, a server 30, and document databases 40 and 50. The client 20 is connected the server 30 through a communication network 10. In the example shown in the figure, two document databases are connected to the server 30, but any number of document databases may be connected to the server. The number of clients is also arbitrary.

The client 20 has a display unit 201, a search request input unit 202, a document database selection unit 203. The server 30 has a relevance degree calculation unit 301, a clustering unit 302, a word extraction unit 303, and a search unit 304. Among the above units, at least the display unit 201 that displays a two-dimensional coordinate plane and the relevance degree calculation unit 301 that calculate the relevance degree between document units are necessary to implement the present invention. The term "document unit" refers to any one of a word, a word group, a sentence, a sentence group, a document, and a document group, and these can be elements to be plotted on the vertical axis or horizontal axis of the two-dimensional coordinate system.

The relevance degree calculation unit 301 provided on the server 30 receives as input a group of two document units extracted from document databases. The two document units may be retrieved from different document databases or identical document database. In the following description, two document units retrieved from the document database are referred to as Document Unit $A_i$ (i=1 to M) and Document Unit $B_j$ (j=1 to N).

The relevance degree calculation unit 301 of the server 30 calculates the relevance degree between Document Unit $A_i$ and Document Unit $B_j$. Herein, any calculation method for relevance degree may be employed. For example, when Document Unit $A_i$ (i=1 to M) is composed of words and Document Unit $B_j$ (j=1 to N) is composed of documents, tf*idf method well known in the art can be employed for calculating the relevance degree between words and sentences. Here, the tf*idf method is a method wherein tf(t, d) that expresses term frequency of a word (t) appearing in a certain document (d) and IDF (inverse document frequency) represented by the following formula are employed and the product of tf(t, d) and idf(t) is regarded as weighting.

$$idf(t) = \log\frac{T}{df(t)} + 1$$

wherein T is the total number of documents and df(t) is the number of documents which contain the word (t). Further, the similarity measure in the SMART system (Singhal, A., Duckley, C. and Mitra, M., "Pivoted Document Length Normalization", in Proceedings of SIGIR '96, pp. 21–29, 1996) that is developed by improving tf*idf method can be also used.

Furthermore, in the case where Document Unit $A_i$ (i=1 to M) and Document Unit $B_j$ (j=1 to N) both are composed of documents, the vector representation of documents is performed using words contained in individual documents and the relevance degree between documents is calculated using the vector space method well known in the art. The vector space method is described in detail in Chapter 10 of "Automatic Text Processing" (Salton, G., ADDISON-WESLEY PUBLISHING COMPANY).

The calculation results of relevance degree is expressed in a matrix format as a data structure and sent to the client 20. FIG. 2 is an example of the data structure and the relevance degree between Document Unit $A_i$ and Document Unit $B_j$ is represented as $x_{ij}$.

Figure 3:
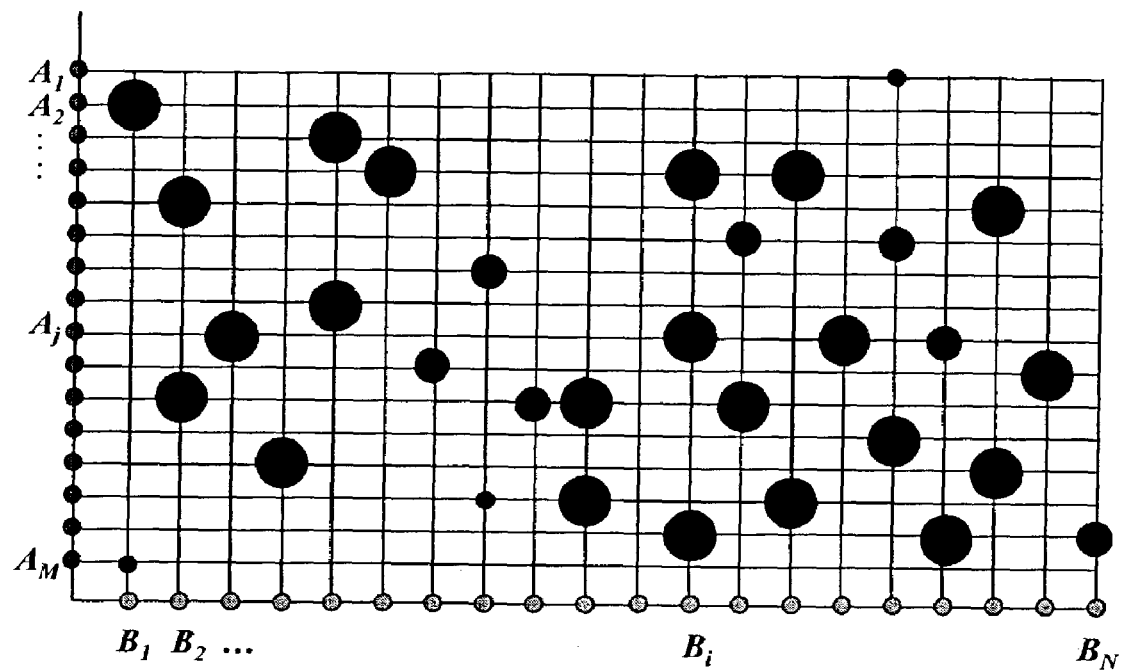
FIG. 3 is a view illustrating an example wherein the relevance degree between document units is visualized in a two-dimensional coordinate system.

The display unit 201 of client 20 utilizes the data received from the relevance degree calculation unit 301 to display the relationship between document units on a two-dimensional coordinate plane. Which document unit to be plotted on either axis is decided arbitrarily, but for the purpose of illustration, Document Units A and B are plotted on the vertical and horizontal axes, respectively. It is supposed that the number of elements in Document Unit A is M and the number of elements in Document Unit B is N. The relevance degree between the j-th element of Document Unit A and the i-th element of Document Unit B is indicated at a coordinate (i, j). Here, the degree of relevance may be represented by difference in the size of an object (circle, square, etc.), the brightness or saturation of color, or the like. The values of relevance degree may be serially expressed. However, it is convenient to digitize the values by delimiting the values with a certain range and express the degree of relevance in stages. FIG. 3 shows an example wherein the relevance degree is represented by three different sizes of circles.

By visualizing the values in such a way, it is possible to visually comprehend the relationship between document units. For example, when Document Units A and B are composed of documents and words, respectively, it is possible to comprehend "which document a certain word is contained in" or "which word a certain document contains" without a lack of the listing property.

Figure 4:
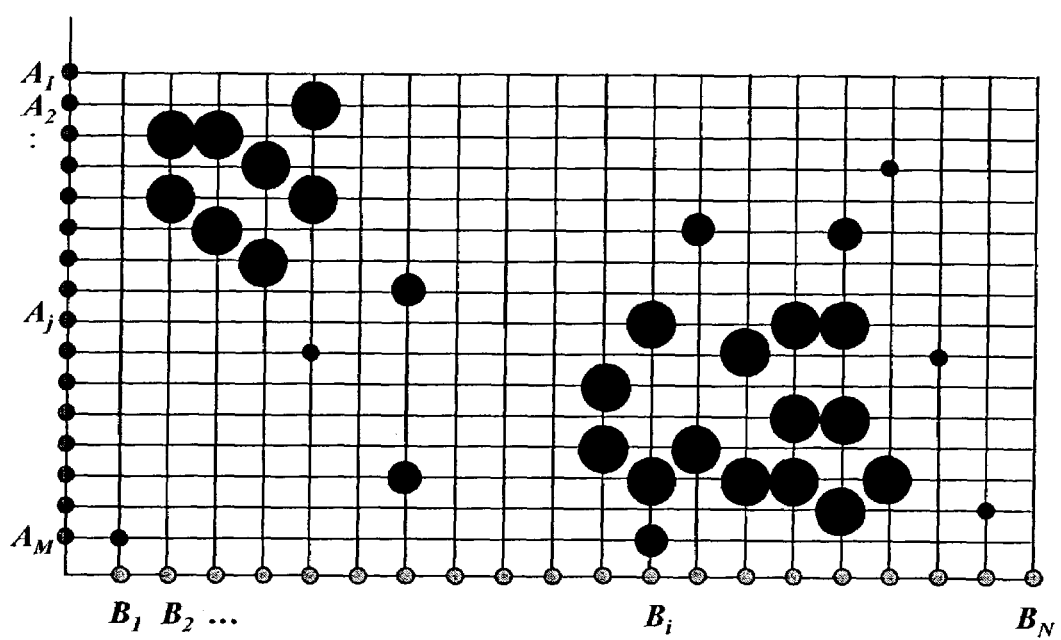
FIG. 4 is a view illustrating a display example after the clustering is carried out.

The clustering unit 302 provided on the server 30 clusters and rearranges both or either of Document Units A and B based on the data outputted from the relevance degree calculation unit 301, and sends the obtained results to the display unit 201 of client 20. The display unit 201 displays the received results in the afore-mentioned method. FIG. 4 shows an example wherein Document Units A and B both are clustered and rearranged. By visualizing the results after clustering on the two-dimensional coordinate plane, document units having similarity with each other are displayed adjacently. Thus, in comparison with a case wherein clustering is not carried out, the relevance between document units can be more clearly grasped.

Figure 5:
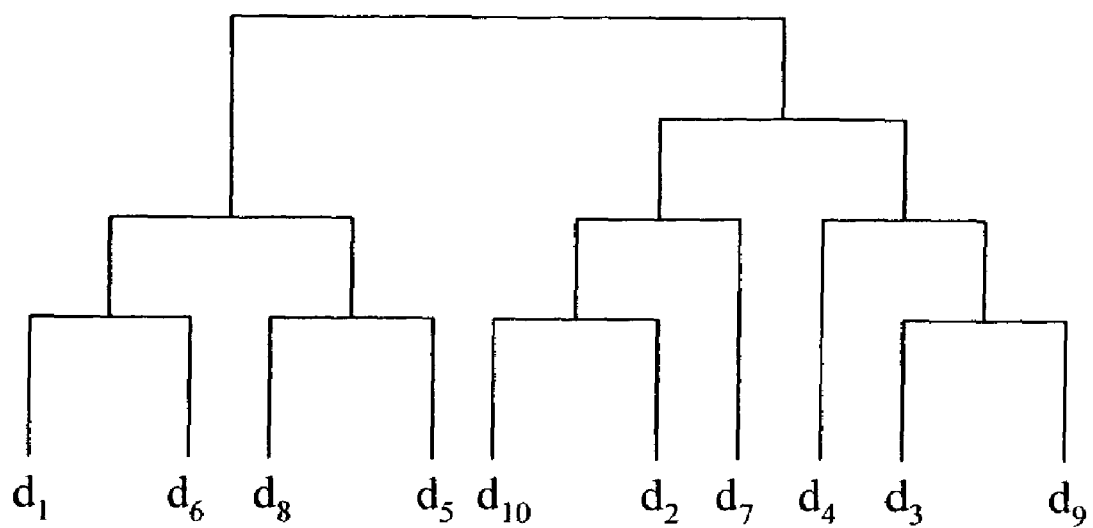
FIG. 5 is a view illustrating an example of hierarchical clustering.

Here, a clustering technique is described taking a case for clustering a document group as an example. Grouping of documents in the group in accordance with similarity is referred to as clustering, and it is divided into two types: hierarchical clustering and non-hierarchical clustering. The results of hierarchical clustering have a tree structure and the results of non-hierarchical clustering have a flat structure wherein only grouping is carried out. The tree structure obtained as a result of hierarchical clustering is referred to as dendrogram. FIG. 5 is an example of a dendrogram. In the dendrogram, when a set of intermediate nodes is selected, a flat cluster like a cluster obtained by non-hierarchical clustering can be obtained.

The fundamental algorithm of hierarchical clustering comprises the following steps.
(1) Make clusters consisting only individual elements.
(2) Calculate all the cluster-to-cluster distances (similarity).
(3) Merge a pair of clusters having the shortest distance therebetween.
(4) Calculate the distance between the resultant cluster and other cluster.
(5) Repeat the above steps (3) and (4) until there is only a single cluster.

In order to calculate the distance in the above process (4), various methods are available, but in general the single link method, the complete link method, the Ward method or the like is often used. The detailed description of each method is found in, for example, Chapter 16 of "Information Retrieval" (Frakes, W. and Baeza-Yates, R. eds, Prentice Hall).

Any clustering method can be used in the present invention, but as a method other than the above, the method disclosed in JP Patent Publication (Unexamined Application) No. 9-62693 "Document classifying method according to probability model" may be used wherein the clustering is carried out by modeling the probability that a certain document is classified into a certain cluster.

The similarity degree required for clustering is calculated based on the data outputted by the relevance degree calculation unit 301. When each line of the table in FIG. 2 is regarded as a vector, each element of Document Unit A can be expressed as a weighting vector for each element of Document Unit B. Then, the element-to-element similarity in Document Unit A can be calculated using a vector space method well known in the art. Likewise, when each column of the table in FIG. 2 is regarded as a vector, the element-to-element similarity in Document Unit B can be calculated. All the element-to-element similarity degrees have to be calculated (See the above process (2) of hierarchical clustering) Using the thus calculated similarity, hierarchical clustering is carried out to configure a dendrogram, thereby enabling document units to be rearranged. FIG. 5 shows an example wherein clustering is carried out on the document group composed of documents $d_1$ to $d_{10}$. By the first cluster merge, documents $d_1$ and $d_6$, $d_8$ and $d_5$, $d_{10}$ and $d_2$, and $d_3$ and $d_9$ are merged, and next clusters ($d_1$, $d_6$) and ($d_8$, $d_5$), a cluster ($d_{10}$, $d_2$) and $d_7$, a cluster ($d_3$, $d_9$) and $d_4$ are merged. In this manner, clusters are merged sequentially, so that the dengrogram shown in the figure is obtained. As a result of this clustering, for example, a document group, $d_1$, $d_2$, $d_3$, ..., and $d_{10}$, which has been arranged on the horizontal axis, is sorted and rearranged in the order of $d_1$, $d_6$, $d_8$, ..., $d_9$.

The element-to-element similarity degree is calculated for each of the vertical axis direction and horizontal axis direction to configure a dendrogram, thereby obtaining the display of FIG. 4.

When visualizing the search results, only document groups of the search results can be obtained as input. The processing of such a case will be described by referring to FIGS. 6 to 9. Herein, for simple explanation, an example wherein document groups are obtained by keyword search is used. However, it is also true the present invention is applicable to document groups obtained not only by keyword search but also any method such as associative search (See JP Patent Publication (Unexamined Application) No. 2000-155758, for example).

Figure 6:
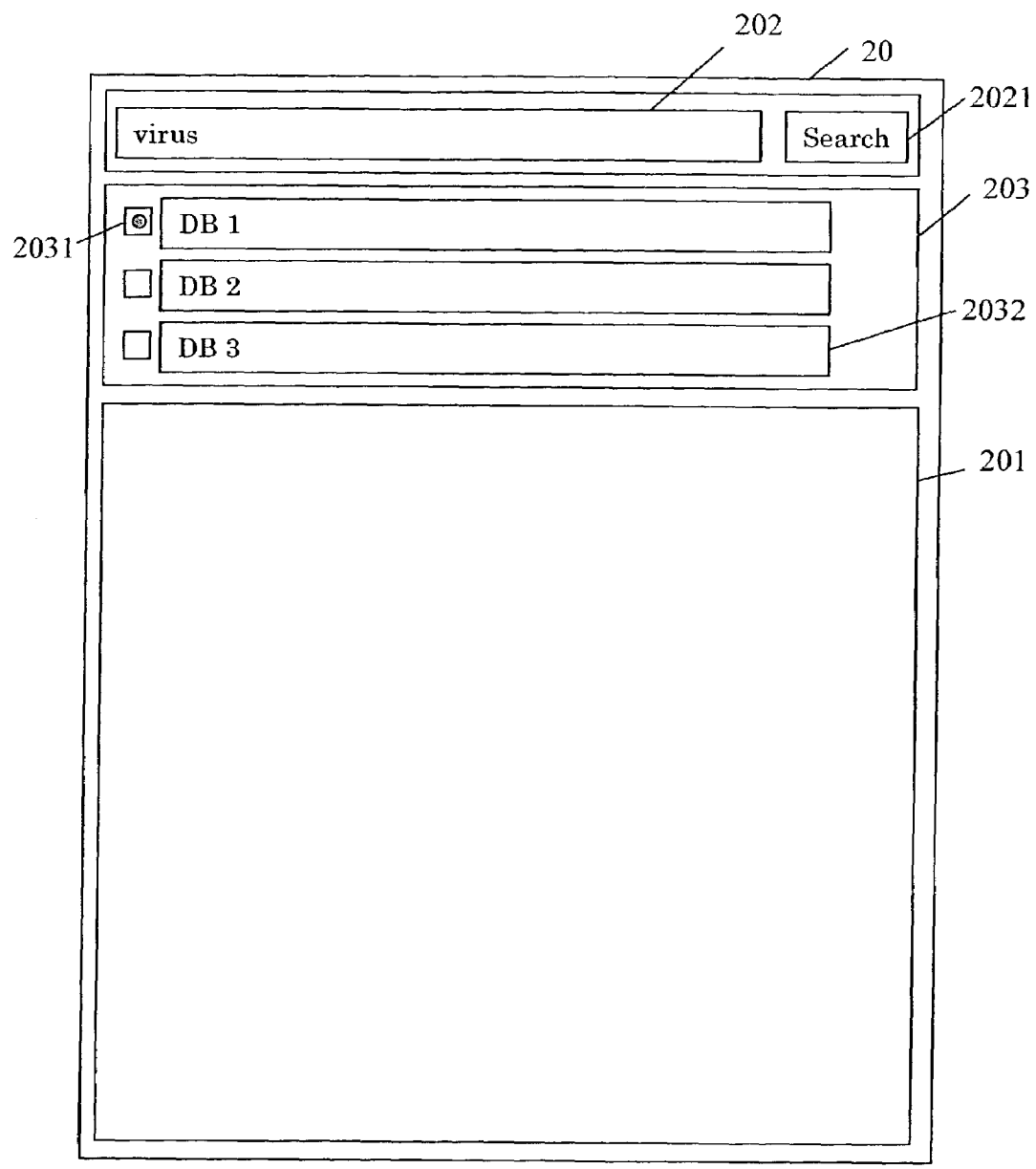
FIG. 6 is a view illustrating an initial screen example of a monitor provided on a client.

FIG. 6 shows an example of the initial screen of a monitor provided on the client 20. The monitor screen comprises a display unit 201 that displays information relevant to the retrieved document group, a search request input unit 202 for inputting search keywords, and a document database selection unit 203 for selecting a desired database.

Figure 7:
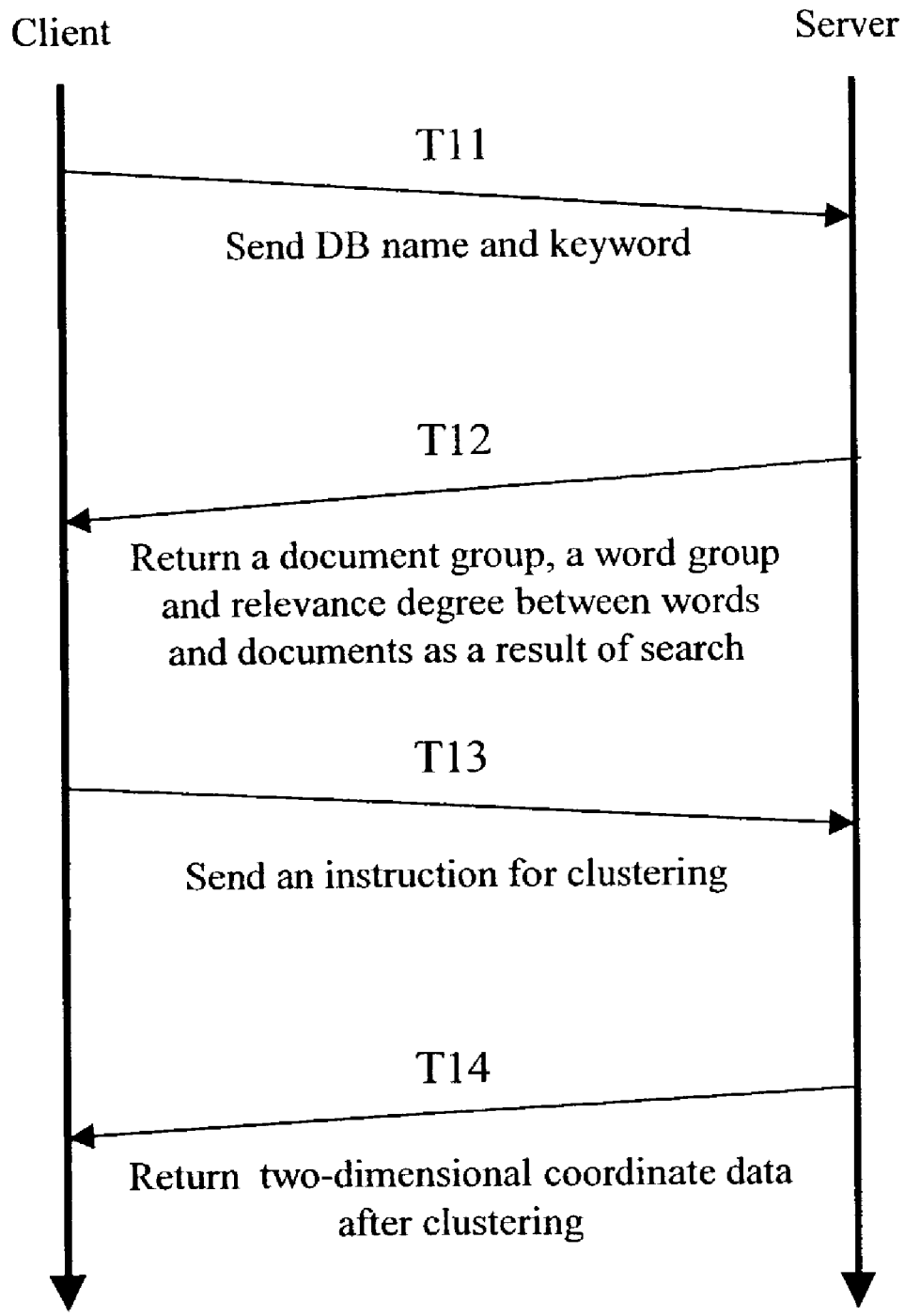
FIG. 7 is a sequential view illustrating the flow of commands and data between the client and a server.

FIG. 7 is a sequential view showing the processing flow of command transmission from the client and data return from the server. When a user inputs a keyword, for example, "virus" into the search request input unit 202 as a search request, selects DB1 through a document database selection button 2031 in the document database selection unit 203, and presses "search" button 2021, the keyword and the information of the selected database are sent to the server (T11).

The server 30 performs keyword searches in the document database designated by the search unit 304 and as a result a document group is obtained. Next, the word extraction unit 303 extracts a word group from the obtained document group. Any method for word extraction can be used, but for example, the aforementioned tf*idf method may be used to calculate the significance of words in documents and extract words in the order of significance. The obtained document group and word group are used as input, and the relevance degree calculation unit 301 calculates the relevance degree between the words and documents. The results are returned to the client (T12). The client 20 visualizes the relevance between the word group and the document group in the two-dimensional coordinate system on the display unit 201 in the same manner as the aforementioned method.

Figure 8:
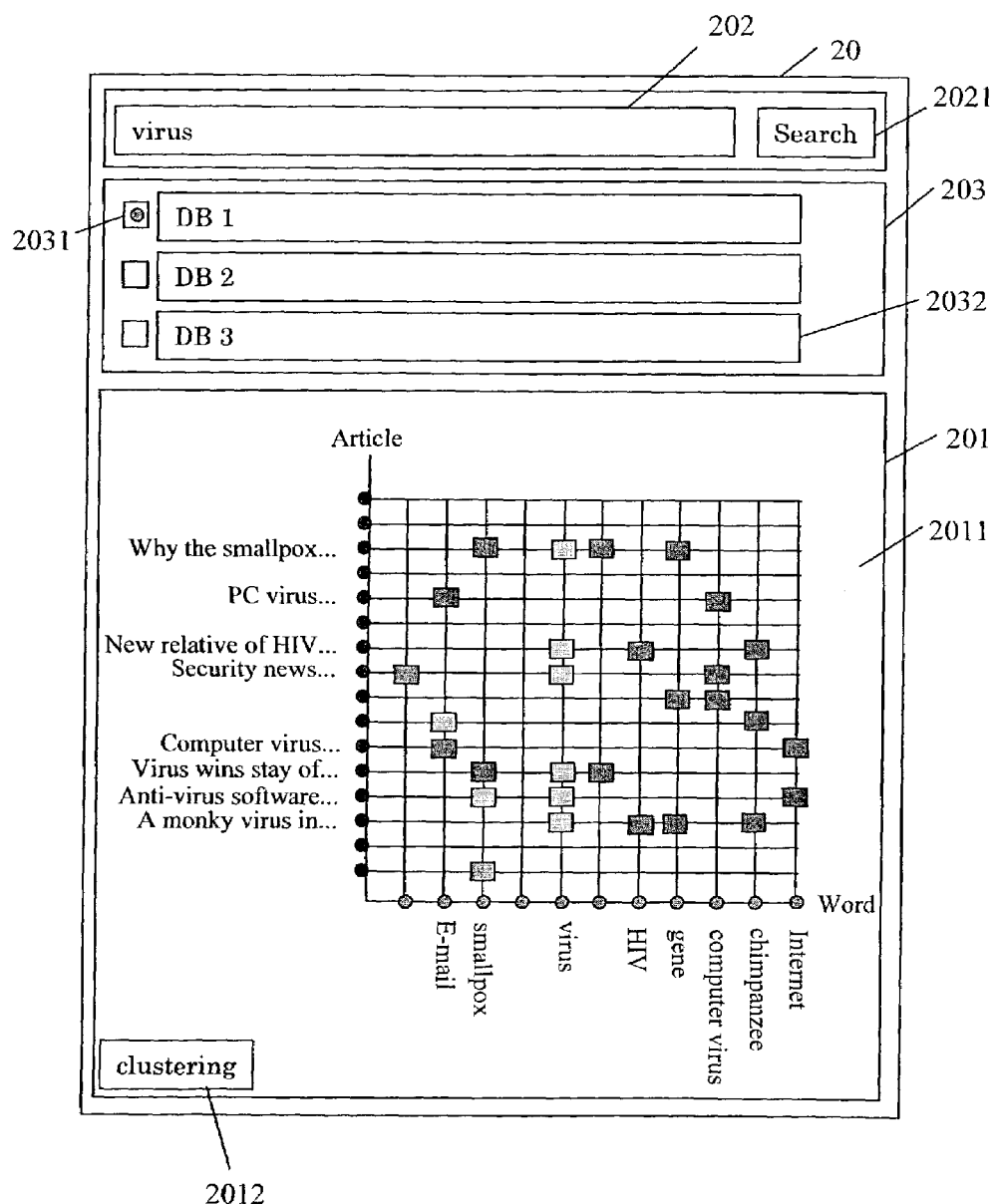
FIG. 8 is a view illustrating a display example in a two-dimensional coordinate system.

FIG. 8 shows a screen example in the two-dimensional coordinate system. In a two-dimensional display unit 2011 of FIG. 8, words are plotted on the horizontal axis and titles of documents are plotted on the vertical axis, and then the relevance degree between them are two-dimensionally displayed. Square objects placed on the intersections of the vertical and horizontal axes indicate the relevance degrees between the documents of the vertical axis and the words of the horizontal axis. As their relevance degree is high, a dark color object is placed. The relevance degree itself is represented sequentially. However, the relevance degrees herein are classified into several grades (e.g., 5 grades) in accordance with the relevance degree and different brightness is assigned to each grade for display. An intersection with no object indicates that there is no relevance between the document of the vertical axis and the word of the horizontal axis or that the relevance degree is equal to or lower than the threshold for display. According to this two-dimensional display, the contents of individual documents can be anticipated to some extent, while taking overview of the entire retrieved documents. However, the dark color objects that indicate high relevance degrees are scattered on the two-dimensional coordinate plane and therefore it is difficult to grasp information on what relevance or the like exists between documents.

Then, the user presses a "clustering" button 2012 displayed on the display unit 201 of FIG. 8 and an instruction for clustering is sent to the server (T13). The clustering unit 302 of the server 30 carries out the clustering of articles on the article axis and also the clustering of words on the word axis, and the results thereof are returned to the client 20 (T14). Upon receipt of the two-dimensional coordinate data after clustering, the client display unit 201 displays the two-dimensional coordinate plane showing the relationship between the words and documents after the elements of the horizontal and vertical axes are rearranged by the clustering. This enables the user to visually grasp topics contained the article group on the two-dimensional coordinate.

Figure 9:
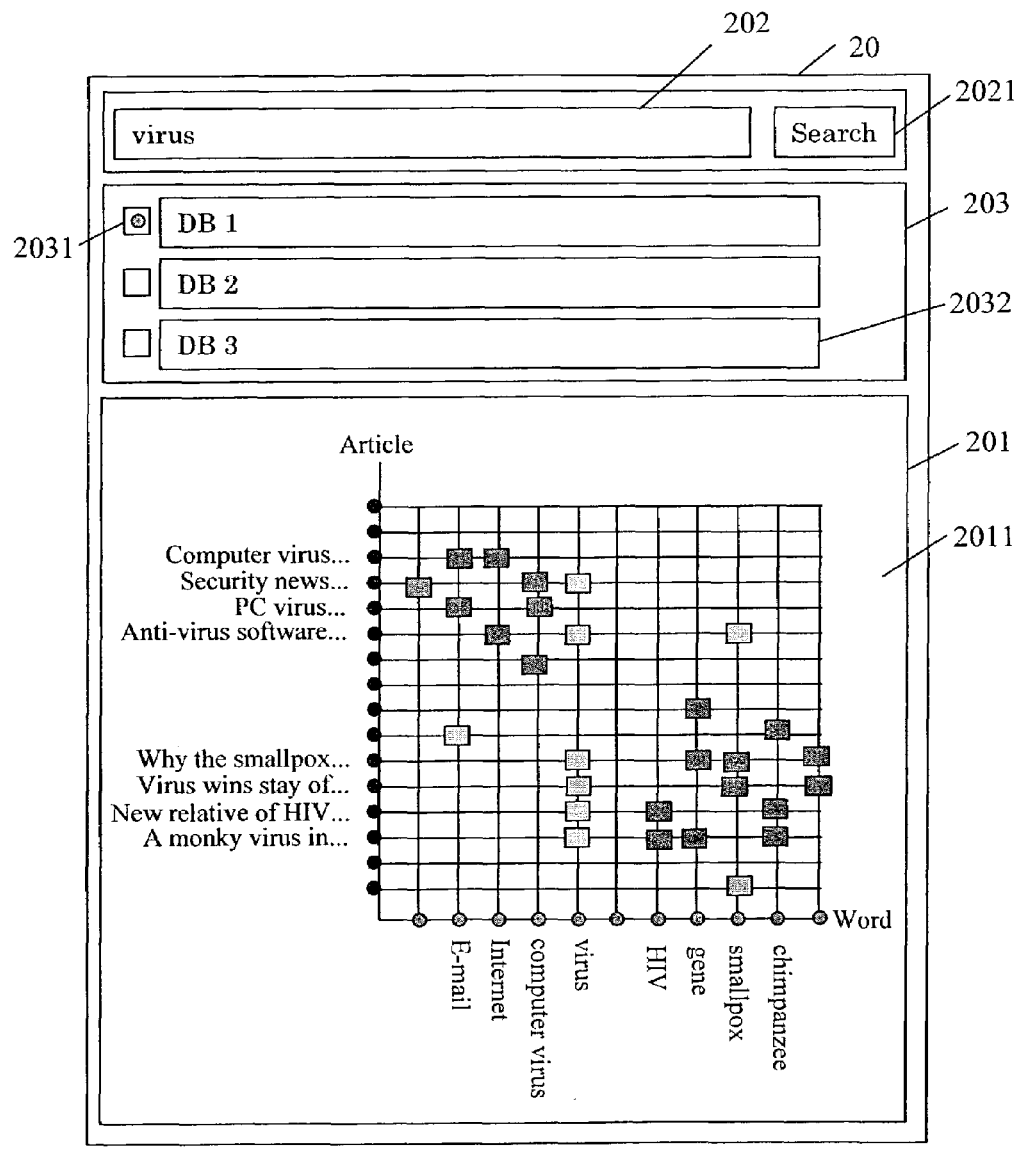
FIG. 9 is a view illustrating a display example in a two-dimensional coordinate system after the clustering is carried out.

FIG. 9 shows a display example illustrating the two-dimensional coordinate of the relevance degree between words and documents after clustering. In the example of FIG. 9, characteristic areas are observed in a lower right unit and a upper left unit, and thus the document group is expected to contain two topics (topics pertaining to computer virus and biological virus). Further, by referring to the word of the vertical axis, information that is not obtainable from article titles can be obtained, and accordingly individual topics can be more deeply understood.

Hereinafter, other display examples of the two-dimensional coordinate of the relevance degree between document units according to the present invention will be described.

Figure 10:
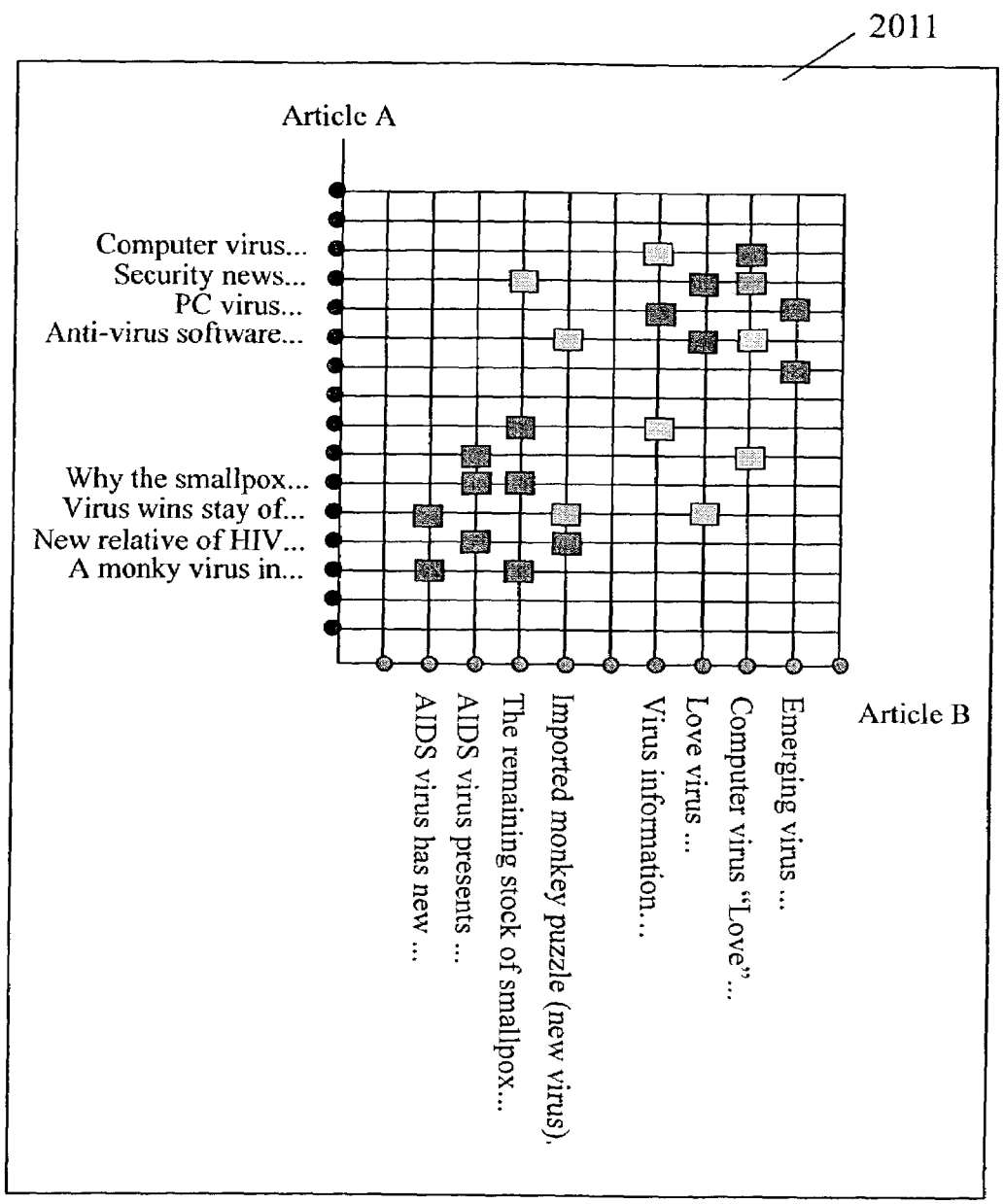
FIG. 10 is a view of an example illustrating that the relationship between two article groups is displayed in a two-dimensional coordinate system.

FIG. 10 shows an example wherein the clustering unit 302 carries out the clustering on and rearranges the elements of both axes when an article group A and an article group B are used as document units A and B, respectively. Any method can be used to obtain two article groups A and B, but for example, simultaneous search is made in two databases using the same keyword and the search results obtained from individual databases may constitute document groups A and B. With respect to the obtained document groups A and B, the relevance degree calculation unit 301 calculates the relevance degree between the elements of document group A and those of document group B. The results thereof are subjected to clustering and rearranged along both axes by the clustering unit 302, thereby obtaining FIG. 10.

When there exist two article groups, it is difficult to understand the relevance between them. However, the visualization as shown in FIG. 10 enables the visual understanding of the relevance between articles (on which article has the relevance with which article) in two article groups. Even when article groups A and B are identical, this can be used to grasp the internal structure of the article group.

Figure 11:
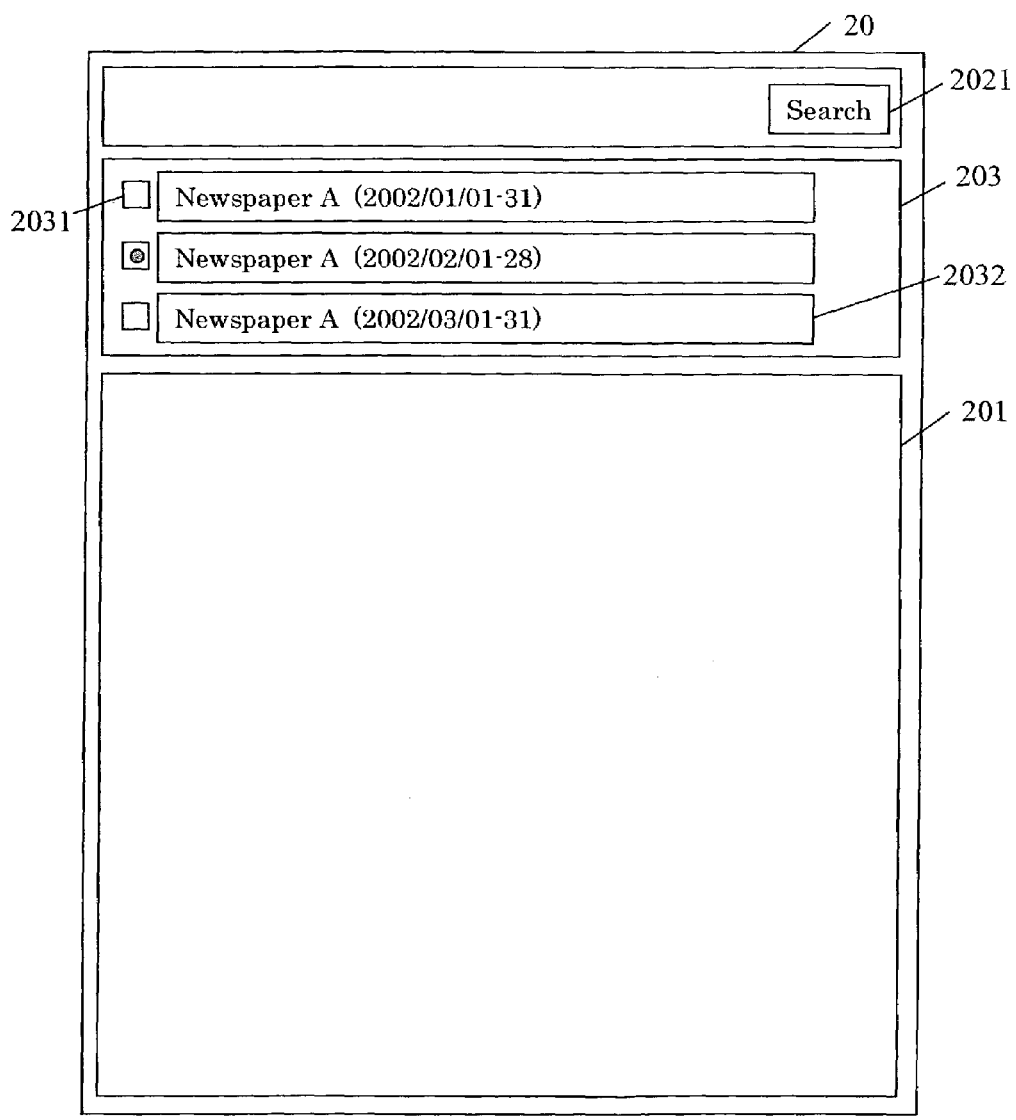
FIG. 11 is a view of an initial screen example to display the relationship between words and articles arranged in order of time in a two-dimensional coordinate system.
Figure 12:
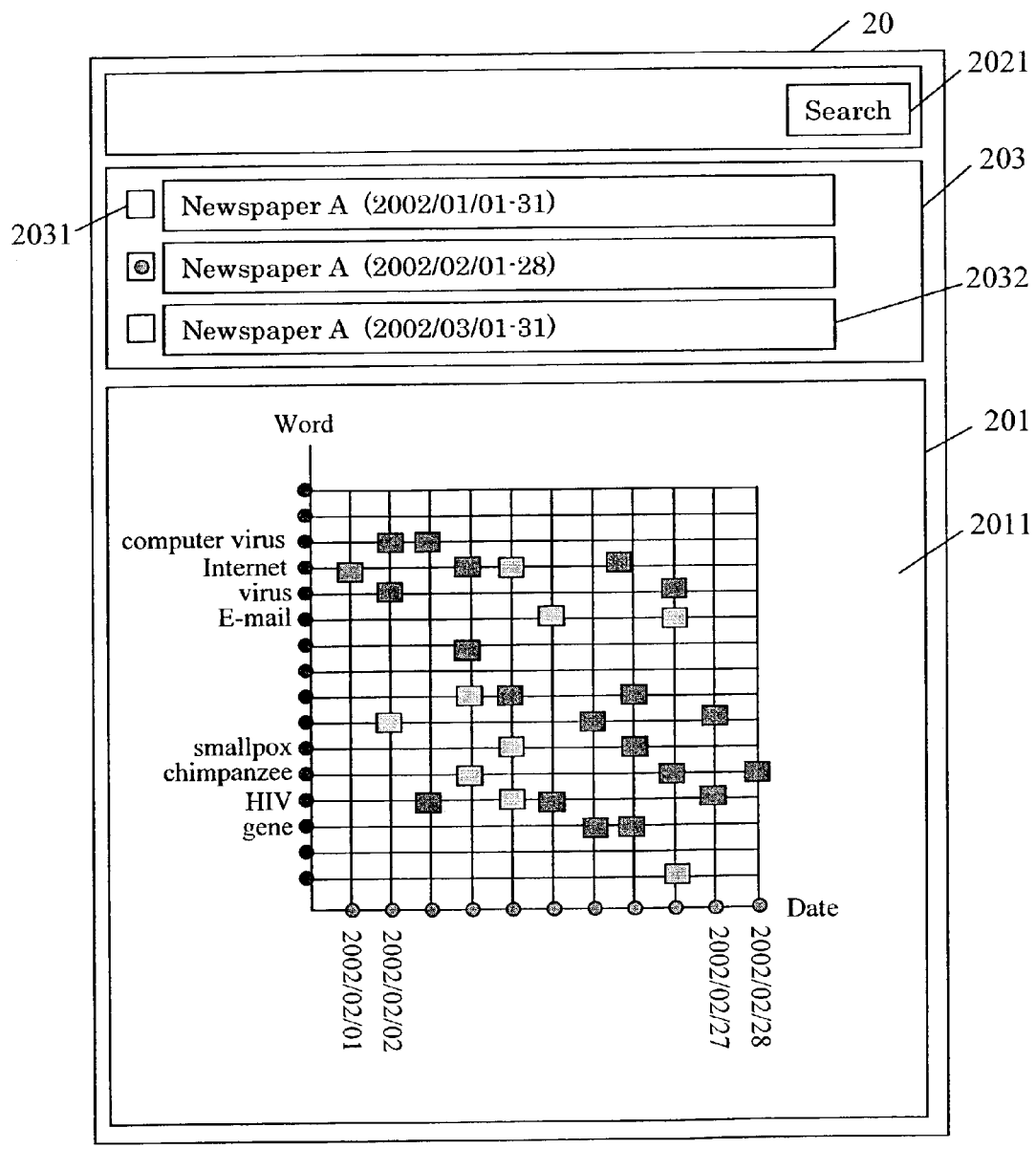
FIG. 12 is a view illustrating an example wherein the relationship between words and articles arranged in order of time is displayed in a two-dimensional coordinate system.

In the case where document unit A is composed of words and document unit B is composed of newspaper articles arranged in order of time, the relationship between them can be visualized in the two-dimensional coordinate system. FIG. 11 shows an example of an initial interface screen to visualize articles of newspapers published by a certain newspaper as a unit of one month in the two-dimensional coordinate system. After selecting "Newspaper A (2002/02/01–28) through the document database selection unit 203 and pressing "Search" button 2021, a group of articles from one-month newspapers are plotted on the horizontal axis in order of time and words extracted from these articles are disposed on the vertical axis for display. FIG. 12 is a screen that displays them. The newspaper articles arranged in order of time and the words contained therein are visualized in the two-dimensional coordinate system whereby the trend of topics in the time sequence can be visually observed.

Figure 13:
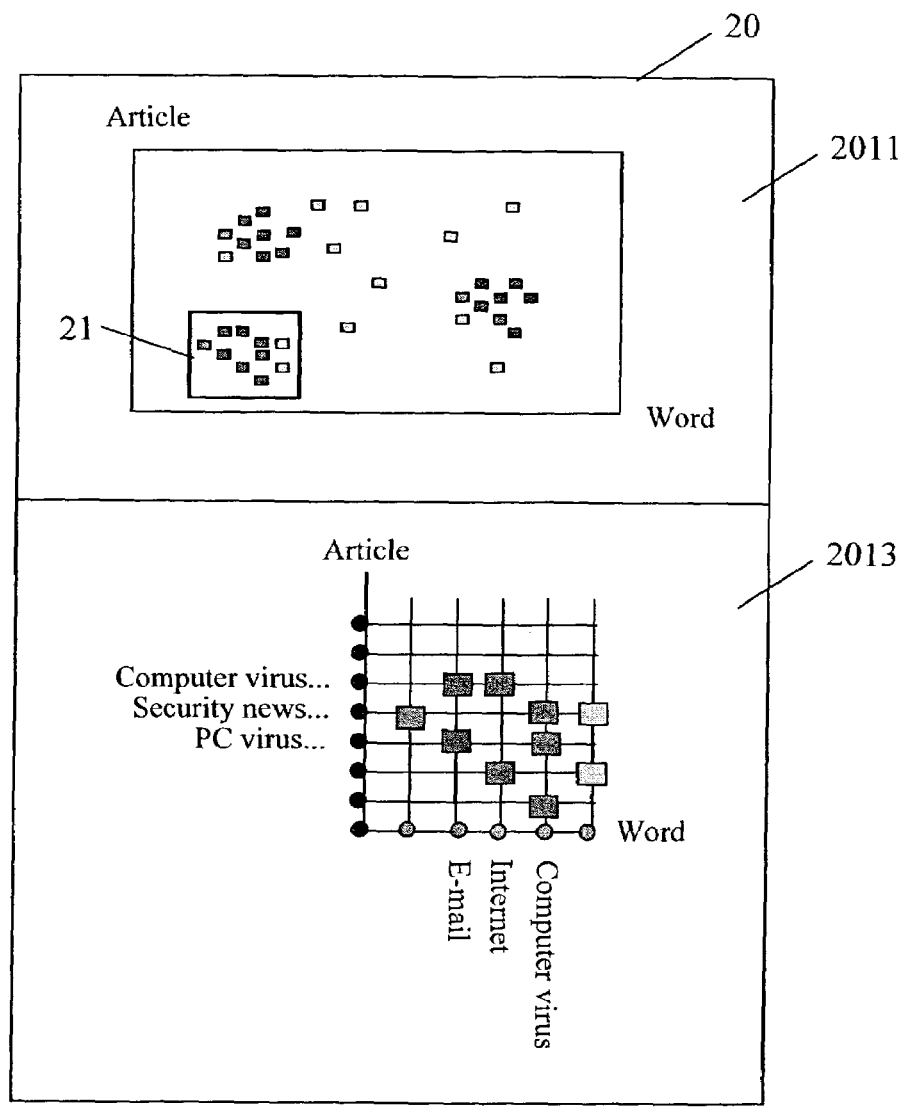
FIG. 13 is a view of an interface example having a function for magnified display of a two-dimensional coordinate plane.

FIG. 13 shows an example of an interface having a function for magnified display of the two-dimensional coordinate plane. As the number of document units to be displayed on the two-dimensional coordinate increases, it is impossible to display all the element names (words, article titles, etc.) on the coordinate axes. In such a case, individual element names can be found by magnifying them.

As shown in FIG. 13, when any range of interest wherein objects with high relevance degrees are concentrated on the two-dimensional coordinate plane displayed in the two-dimensional coordinate display unit 2011, is selected as a designated range portion 21, that portion of the two-dimensional coordinate plane is magnified and displayed on a magnified display unit 2013, thereby finding the element names on the vertical and horizontal axes. The range selection can be conducted by dragging a mouse and designating two points on a diagonal line of a rectangle region.

When there exist two sentence groups (sentence groups A and B), the sentence groups A and B are plotted on one axis and the other axis, respectively, and the relevance degree between an element i of the sentence group A and an element j of the sentence group B may be displayed at a coordinate (i, j). The relevance degree can be represented by colors or shape of objects to be displayed at a coordinate (i, j). When both sentence groups A and B belong to a single identical document (e.g., an outline and a main body of a thesis, and claims and description of examples in a patent publication), it is possible to grasp the internal structure of the document by displaying the correspondence relationship of sentence groups in the document in the two-dimensional coordinate system. In the case where sentence groups A and B are derived from two different documents, it is possible to analyze the internal structure of documents, such as which portions of the two documents are relevant, and at the same time to compare sentence groups A and B with each other by displaying the correspondence relationship of sentence groups in two documents in the two-dimensional coordinate system.

Figure 14:
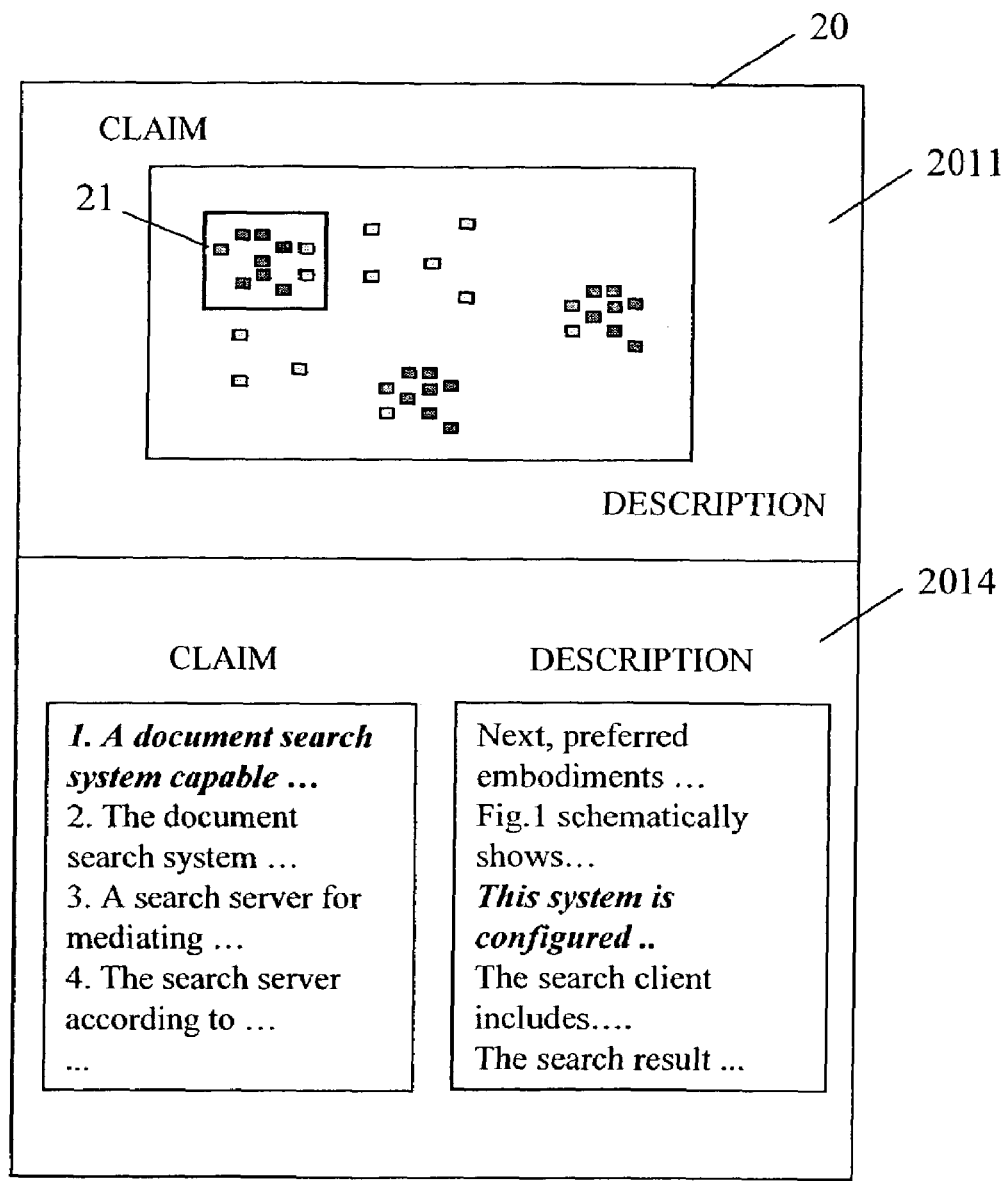
FIG. 14 is a view of an interface example having a function to associate sentence groups with each other by simultaneously displaying a two-dimensional coordinate plane and documents.

FIG. 14 shows an example of an interface having a function to associate sentence groups with each other by simultaneously displaying the two-dimensional coordinate plane of document units and the contents of the document units. As the document units A and B, claims of a patent publication and description of examples or paragraphs of the patent publication are used respectively to display them on the two-dimensional coordinate plane in the two-dimensional coordinate display unit 2011.

and main text of examples in a patent publication are displayed on a main body display unit 2014. Here, when an arbitrary range 21 on the two-dimensional coordinate is selected by dragging a mouse or the like, claims and sentences of examples corresponding to that range are identified and displayed on the main body display unit 2014. In FIG. 14, bold and italic letters are used for identification, but any method can be employed therefor.

Figure 15:
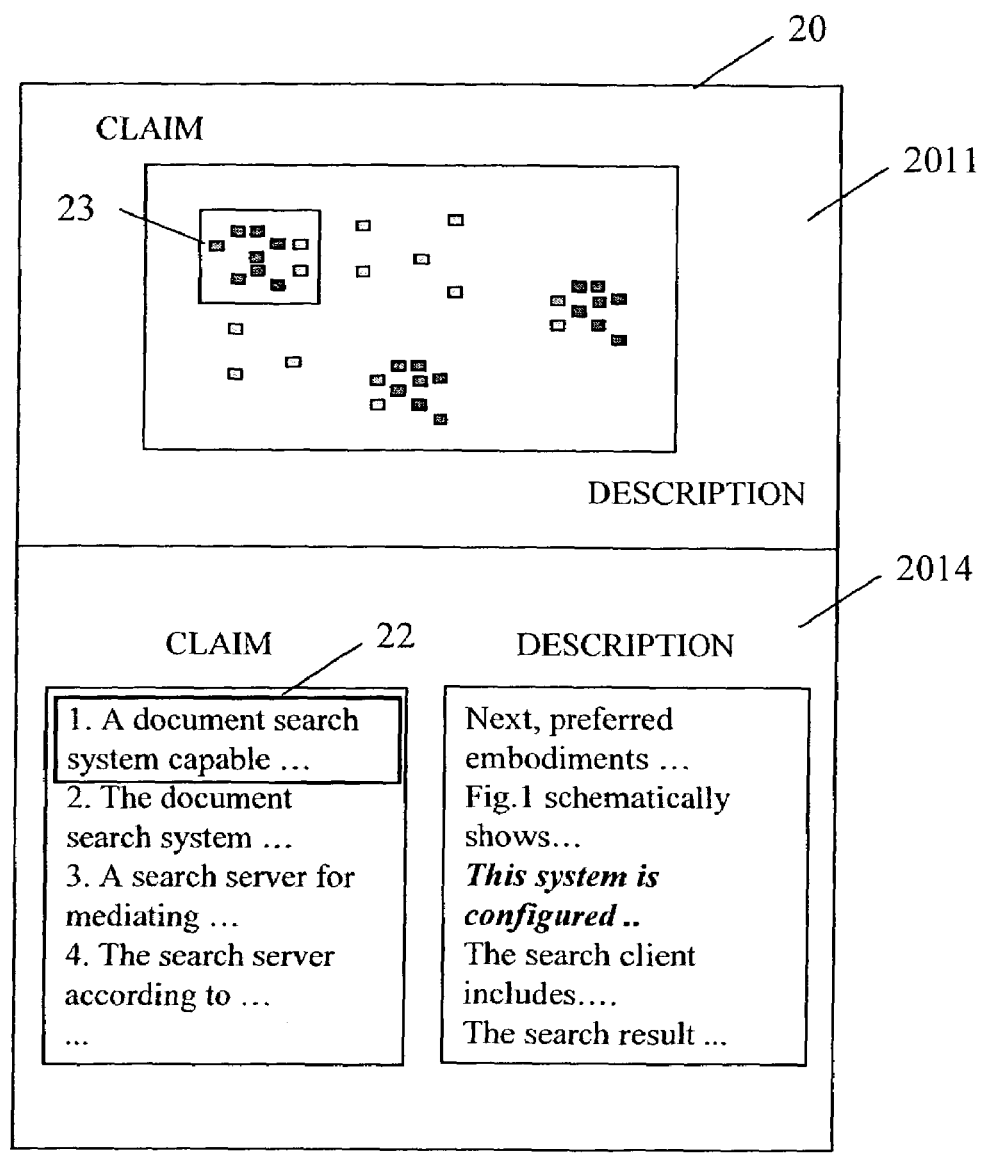
FIG. 15 is a view of an interface example having a function to associate sentence groups with each other by simultaneously displaying a two-dimensional coordinate plane and documents.

In this case, when a specific sentence displayed on the main body display unit 2014 is selected, a region on the two-dimensional coordinate corresponding to that sentence may be identified and indicated. FIG. 15 shows an example thereof. When an arbitrary sentence 22 in CLAIM displayed on the main body display unit 2014 of FIG. 15 is selected by clicking a mouse or the like, the range 23 on the two-dimensional coordinate plane corresponding to that sentence is identified and displayed. Further, a sentence associated with the selected sentence of CLAIM is identified in DESCRIPTION and indicated by italic and bold letters. When an arbitrary sentence of DESCRIPTION is selected, the identification and indication is performed in the same manner as the above. Although enclosing with a rectangle is used in FIG. 15 for identification on the two-dimensional coordinate, any means for identification may be used.

The use of this interface enables a user to visually grasp the correspondence relationship between individual sentence groups and to easily make overview, comparison, and analysis on the contents.

All publications, patens and patent applications cited herein are incorporated herein by reference in their entirety.

What is claimed is:

1. A document information display system implemented in a computer for displaying information relevant to a plurality of documents on a screen, wherein
    a two-dimensional coordinate plane having a document or a sentence plotted as an element on one axis, and a document group, a document, a sentence, or a word plotted as an element on the other axis, respectively, is displayed; and
    a relevance degree between said element of the one axis and a corresponding element of the other axis is displayed at each point of the two-dimensional coordinate plane.

2. The document information display system according to claim 1, wherein the plurality of documents are obtained by a database search.

3. The document information display system according to claim 1, wherein a color having a brightness or saturation depending on the relevance degree, or a symbol having a size depending on the relevance degree is displayed at the coordinate point.

4. The document information display system according to claim 1, wherein the arrangement order of the elements of the one axis and/or the other axis reflects the similarity of the elements.

5. The document information display system according to claim 1, wherein the system has a function to magnify and display a designated range of the two-dimensional coordinate plane.

6. The document information display system according to claim 1, wherein the elements of the one axis are composed of documents obtained by the database search and the elements of the other axis are composed of words which are contained in the documents obtained by the database search.

7. The document information display system according to claim 1, wherein the elements of both the one and the other axes are composed of documents.

8. The document information display system according to claim 1, wherein the elements of the one axis are composed of a group of documents issued during a predetermined period and the elements of the other axis are composed of words.

9. A document information display method implemented in a computer for displaying information relevant to a plurality of documents on a screen, comprising the steps of:
    calculating a relevance degree between an individual element of a first group composed of a document group or a sentence group in a document and an individual element of a second group composed of a group of document groups, a document group, a sentence group, or a word group; and
    plotting the element of the first group on one axis and the element of the second group on the other axis, respectively, of a two-dimensional coordinate plane, and displaying the relevance degree between the element of said one axis and a corresponding element of the other axis at each point of the two-dimensional coordinate plane.

10. The document information display method according to claim 9, wherein the first group is a document group, the second group is a word group, and the method comprises a step of extracting the word group from the document group.

11. The document information display method according to claim 10, comprising the step of searching a document database for the document group.

12. The document information display method according to claim 9, wherein a color having a brightness or saturation depending on the relevance degree, or a symbol having a size depending on the relevance degree is displayed at the coordinate point.

13. The document information display method according to claim 9, comprising the steps of:
    calculating the similarity among the elements of one axis and/or the elements of the other axis; and
    rearranging the elements of one axis and/or the elements of the other axis depending on the similarity.

14. The document information display method according to claim 9, further comprising the step of:
    designating a range of the two-dimensional coordinate plane; and magnifying and displaying the designated range.

15. A document search method implemented in a computer comprising the steps of:
    receiving a search request on a document database;
    searching the document database in accordance with the search request and obtaining information on a plurality of documents;
    extracting a plurality of words from the plurality of documents obtained by the search;
    calculating a relevance degree between individual documents and individual words;
    transmitting information relevant to the plurality of documents, the plurality of words, and the relevance degree between individual documents and individual words; and
    plotting the individual documents on one axis and the individual words on the other axis, respectively, of a two-dimensional coordinate plane, and displaying the relevance degree between the individual documents of said one axis and the individual words of the other axis at each point of the two-dimensional coordinate plane.

16. The document search method according to claim 15, further comprising the steps of:
    calculating the similarity between the plurality of documents and/or the similarity between the plurality of words; and
    sending the calculated similarity between the plurality of documents and/or the calculated similarity between the plurality of words.

* * * * *